United States Patent [19]
Forkner

[11] 4,068,007
[45] Jan. 10, 1978

[54] FOOD PRODUCT CONTAINING EXPANDED CELLULAR MATERIAL AND METHOD OF MANUFACTURE

[76] Inventor: John H. Forkner, 2116 Mayfair Drive, West, Fresno, Calif. 93703

[21] Appl. No.: 669,025

[22] Filed: Mar. 22, 1976

Related U.S. Application Data

[63] Continuation of Ser. No. 524,448, Nov. 18, 1974, abandoned.

[51] Int. Cl.² ............................................. A23G 3/00
[52] U.S. Cl. .................................... 426/106; 426/660; 426/445; 426/392; 426/650
[58] Field of Search ................... 426/94, 90, 275, 106, 426/283, 125, 660, 445, 392

[56] References Cited

U.S. PATENT DOCUMENTS

| 3,450,538 | 6/1969 | McKown et al. | 426/283 |
| 3,711,300 | 1/1973 | Forkner | 426/275 |
| 3,779,772 | 12/1973 | Forkner | 426/94 |

*Primary Examiner*—Jeanette M. Hunter
*Attorney, Agent, or Firm*—Flehr, Hohbach, Test, Albritton & Herbert

[57] ABSTRACT

A method for the manufacture of edible products having cellular expanded disaccharide based material. The material before expansion is formed into relatively thin flat wafers, preferably as an aggregate of expandable pieces that are adhered together. The wafers are assembled in a container and held spaced apart a predetermined distance. Then they are expanded by heating to soften the material and by subjecting the softened material to a partial vacuum, the expansion being sufficient to take up the spacing between the expanded wafers and to cause the wafers to be in face-to-face juxtaposition, thereby forming a compact group pack which may be enclosed in a sealed package until used. Also edible products resulting from the method and sandwich type products of which the expanded wafer is one layer and which, in one embodiment, includes an edible layer of cooked ground or chopped meat and layers of baked dough. Another embodiment employs the expanded wafer upon or between layers of cooked dough, such as hot pancakes.

6 Claims, 18 Drawing Figures

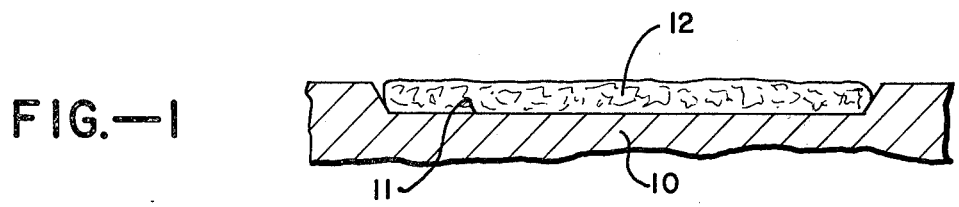
FIG.—1
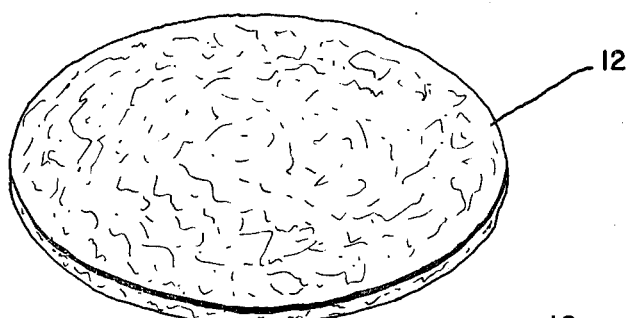
FIG.—2
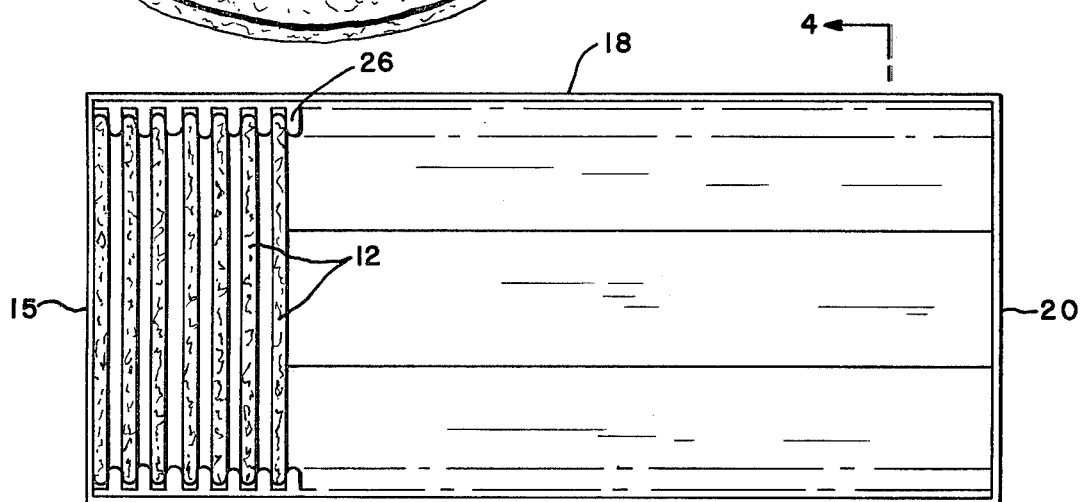
FIG.—3
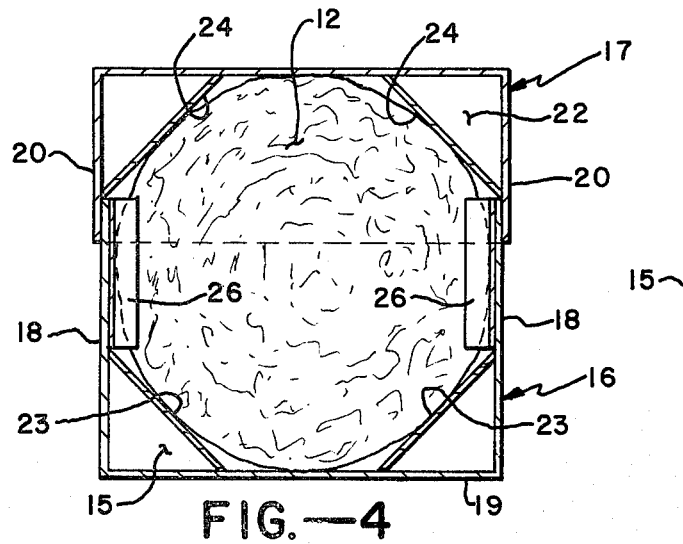
FIG.—4
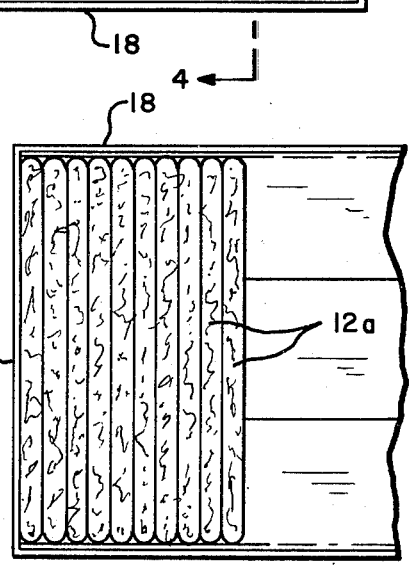
FIG.—5

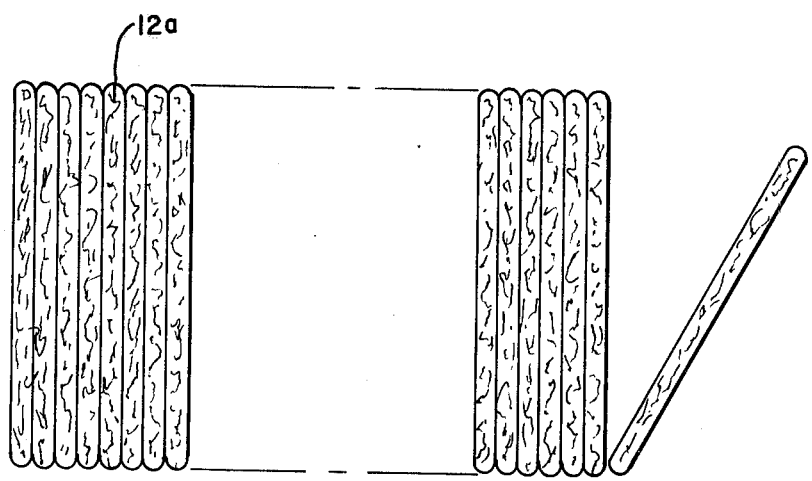
FIG.—6
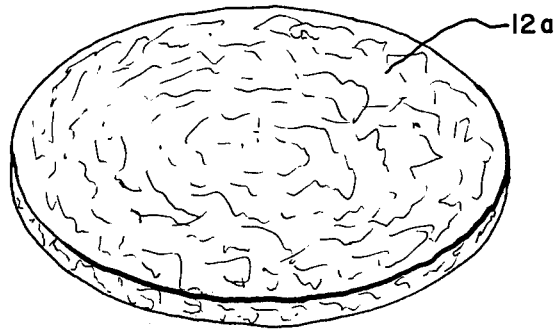
FIG.—7
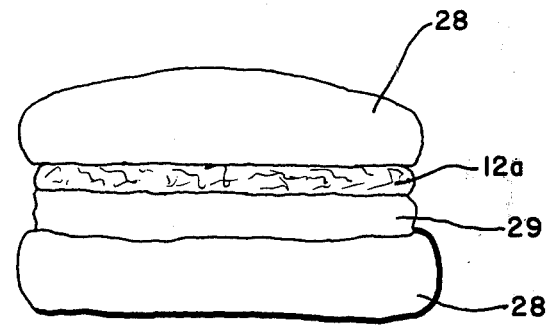
FIG.—8
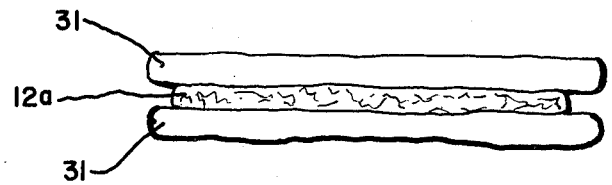
FIG.—9

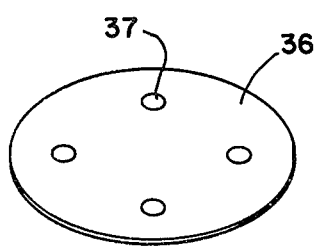
FIG.—10
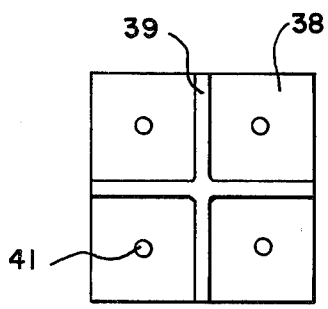
FIG.—11
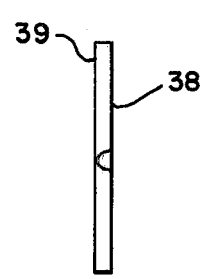
FIG.—12
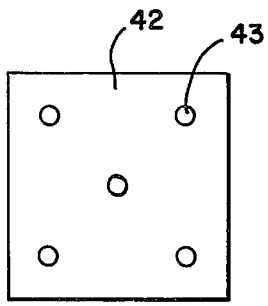
FIG.—13
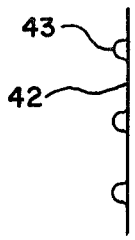
FIG.—14
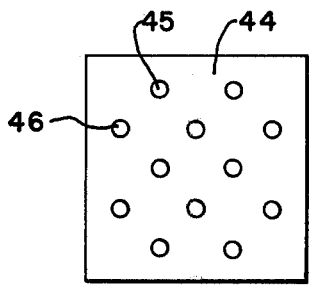
FIG.—15
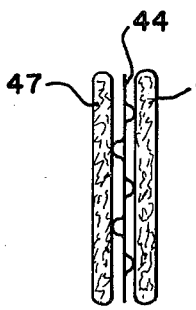
FIG.—16
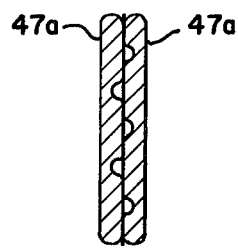
FIG.—17
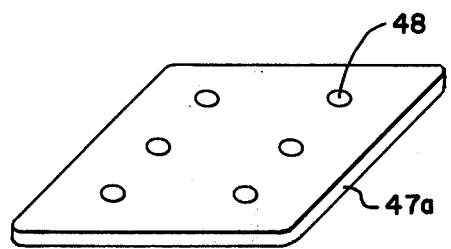
FIG.—18

FOOD PRODUCT CONTAINING EXPANDED CELLULAR MATERIAL AND METHOD OF MANUFACTURE

BACKGROUND OF THE INVENTION

This application is a continuation of Ser. No. 524,448, filed Nov. 18, 1974, now abandoned.

This invention relates generally to food products making use of cellular expanded materials and to methods for their manufacture.

Various edible expanded products and methods for their manufacture are shown in my U.S. Pat. Nos. 3,711,300, 3,779,772 and 3,782,966. The expandable material used in the methods of these patents is formulated to include a material, like corn sugar or corn syrup, which imparts expandability. It is prepared in a manner similar to the manufacture of confections, such as conventional hard candy. It is expanded to the desired degree by heating to soften the material and subjecting it to a partial vacuum. As shown in my U.S. Pat. No. 3,779,772 the expandable material can be prepared as an aggregate mass made up of expandable pieces that are bonded together. I have found that materials having nominal or minimum sweetness, such as hydrolyzed cereal solids of low dextrin equivalence (e.g., Morex of 15 to 35 DE) are expandable and may be used in place of materials like corn sugar and corn syrup, or to reduce the content of the latter.

SUMMARY OF THE INVENTION AND OBJECTS

In general, it is an object of the present invention to provide edible products of the sandwich type in which one or more layers is an expanded, cellular material.

A further object of the invention is to provide edible products of the type described above which include a layer of cooked or grilled meat like hamburger.

Another object is to provide a cellular expanded layer for the uses referred to above which does not have objectionable sweetness and which enhances the eating properties of the sandwich.

Another object of the invention is to provide a compact column like assembly of expanded wafers, whereby individual wafers can be separately removed as desired.

Another object of the invention is to provide a method for the manufacture of the above products, the method serving to expand assembled wafers to form a compact pack or group.

In general, the invention provides a method for the manufacture of edible expanded, cellular wafers, involving forming aggregates of pieces adhered together in wafer form with the pieces being sugar based material having expandable properties. A plurality of these wafers are assembled with spacing between adjacent wafers, and then the wafers are expanded by heating to soften the same and by subjecting the wafers to a partial vacuum. The expansion serves to bring adjacent wafers into face-to-face juxtaposition. Preferably, the wafers are held in the desired space relationship by placing them in a carton or container which has means for retaining the unexpanded wafers in the desired spaced relationship. The group of wafers thus formed is a compact pack or group, and individual wafers can be separately removed without causing wafer breakage or crushing. The invention also includes the manufacture of a food product of the sandwich type having at least one layer of edible material which is hot, the method involving introducing into the sandwich, in direct contact with or adjacent to the hot layer, one of the expanded wafers. In certain embodiments, the material of the wafer may contain seasoning materials such as flavoring, herbs and spices, which enhance the flavor and edibility of the sandwich. A particular food product of this type contains one layer of hot cooked meat, such as hamburger, with the expanded wafer in juxtaposition with the hot meat. For example, in one form, a layer of edible material like cheese may be inserted between the meat and the expanded wafer, and in another form, the wafer may be in direct contact with the meat.

Further objects and features of the invention will appear from the following description in which the preferred embodiments are set forth in detail in conjunction with the accompanying drawing.

DESCRIPTION OF THE DRAWING

FIG. 1 illustrates a molding operation for the formation of the unexpanded wafers.

FIG. 2 illustrates one of the unexpanded wafers.

FIG. 3 is a plan view of a container, with its lid removed, showing the manner in which wafers are held in spaced relationship.

FIG. 4 is a sectional view along lines 4—4 with the lid on the container.

FIG. 5 illustrates the container shown in FIG. 3 after the wafers have been expanded.

FIG. 6 is a side elevation view showing a pack or group of wafers with each wafer being lightly bonded to the adjacent wafer after removal from the retaining means used during expansion, such as the container shown in FIGS. 3 and 4.

FIG. 7 is a perspective view illustrating a wafer after its removal from a compact assembly as shown in FIG. 6.

FIG. 8 is a side elevation view of a sandwich of the hamburger type showing an expanded wafer used as a layer in direct contact with the cooked meat.

FIG. 9 is a side elevation view of a sandwich of the hot cake type in which the expanded wafer is interposed as a layer between two hot cakes.

FIG. 10 is a perspective view illustrating a simple separating element which can be used between the wafers.

FIG. 11 is a side view of another type of separator.

FIG. 12 is an end view of the separator shown in FIG. 11.

FIG. 13 is a side view of another type of separator having pressed in protrusions.

FIG. 14 is an end view of the separating element shown in FIG. 13.

FIG. 15 is another type of separator in which pressed in protrusions are provided on both sides.

FIG. 16 illustrates the separator of FIG. 15 between two wafers.

FIG. 17 illustrates the manner in which the separator protrusions may impress themselves upon the wafer at the time the wafer is expanded.

FIG. 18 is a perspective view of an expanded wafer which has been imprinted in the manner illustrated in FIGS. 16 and 17.

DESCRIPTION OF THE PREFERRED EMBODIMENTS

As previously stated, the method of this invention involves initially the formation of an expanded wafer having characteristics making it suitable for use in food products of the sandwich type, and particularly a pack or group from which expanded wafers can be removed individually for such use.

The unexpanded wafers are formed from pieces of expandable material which are adhered together as an aggregate. As will be presently explained, the pieces before being adhered together can be intermixed or surfaced with more finely divided or powdered materials which, under comparable conditions, expand to a greater degree than the pieces, such powdered materials being applied before or while the pieces are caused to be adhered together as an aggregate. As disclosed in my U.S. Pat. No. 3,779,772, the pieces may be a confection containing material which imparts expandable characteristics to the pieces. When sweetness is not desired or is to be avoided, I can employ hydrolyzed cereal solids of low dextrin equivalency (e.g., Morex of 15 to 35 DE). When sweetness is not objectionable or is desirable, I can use corn sugar or corn syrup, such as is commonly used in confections. A suitable procedure for forming such pieces is to provide a confection having a sugar which imparts expandability and which has the consistency of hard candy with a moisture content of the order of 1 to 5%. While the confection is at a sufficiently low temperature to render it brittle, it is broken into pieces which, for example, may range in size from ¼ to 5/16 inches in diameter. These pieces, with or without being coated or mixed with expandable powdered materials, as will be presently explained, are formed into wafers of the size and configuration desired. For example, the pieces may be introduced into a suitable mold cavity and sufficient heat applied to make the surfaces soft and sticky. Some compaction can be applied to reduce the overall volume, and after cooling, to harden the wafers, they are removed from the mold.

FIG. 1 schematically illustrates such a wafer molding operation. The mold 10 has a cavity 11 which is circular and of a depth corresponding to the thickness of the unexpanded wafer desired (e.g., 5/16 inch). The mold cavity is shown filled with the pieces 12 of the expandable material, with or without additional expandable, powdered material, and then the material is heated to an elevated temperature (e.g., 140° F.) sufficient to soften the pieces and render their surfaces sticky. As a result, the pieces are caused to adhere together as an aggregate. Adhesion between the pieces may be aided by some compaction of the mass. After the wafer has cooled, it is removed and appears as shown in FIG. 2.

Techniques other than molding can be used to provide unexpanded wafers of desired size and shape. With respect to the individual pieces of expandable material, they can be formed by passing sheets of expandable material, while in soft condition, over die-forming rolls, the cavities of which form pieces of the size and shape desired. Instead of molding wafers as aggregates made up of such pieces, a sheet can be formed causing the pieces to adhere together in sheet form, and then wafers of the desired size and form can be cut from such a sheet.

In one embodiment, an assembly of wafers such as shown in FIG. 2 are expanded and caused to lightly adhere together as a compact pack or group from which wafers can be individually removed for use. One procedure for forming such a pack employs collapsible spacing means, as shown for example, in FIGS. 3 and 4. The container in this instance is in the form of a box or carton including a rectangular body 16, and a top 17 which can be fitted upon the body. The body includes side walls 18, bottom wall 19, and end walls 15. The top is shown including side walls 20, top wall 21, and end walls 22. The body may also include the walls 23 which extend the length of the box and at an angle of 45° to the side and bottom walls 18 and 19. Similar walls 24 may be provided for the top 17. All of the walls of the container can be made of suitable lightweight fiberboard. To provide the desired spacing between the wafers, corrugated strips 26 are shown lightly attached to the inner surfaces of the side walls 18. The strips are made of a material which will not tightly adhere to the expanded wafers, thus permitting ready separating at the time individual expanded wafers are removed from the package. Particular reference can be made to such materials as paper of the parchment type, various waxed papers, and various porous and plastic film materials. A plurality of unexpanded wafers are assembled within the container with peripheral edges of the wafers interposed within the corrugations of strips 26, whereby they are maintained in spaced parallel relationship as shown in FIG. 3. Preferably, the dimensions of the container are such that clearance is provided about the peripheries of the wafers for some expansion in the direction of their diameters.

After the wafers have been assembled within the main body of the container in the manner shown in FIG. 3 and the top applied, the incompletely sealed container is placed in an oven whereby the wafers are heated to soften the same, as for example, to a temperature within the range of 120° to 150° F. The assembly is then introduced into a chamber and subjected to a partial vacuum of the order of 28 to 29 inches mercury column. This causes the desired expansion of the wafers, the degree of expansion being controlled whereby the side faces of each wafer comes into juxtaposition with, and in this instance, in direct contact with the faces of adjacent wafers, thus eliminating the spacing between the wafers to form a tight or compact pack and causing the wafers to be lightly bonded together. During expansion, the corrugated strips 26 are collapsed between the wafers.

After the wafers have cooled to ambient temperature, the entire group or pack of wafers can be removed from the container, thus providing a self-supporting group which can be placed in a suitable sealed bag or package. Instead of removing the wafers at the time they are manufactured, the entire container preferably is sealed as by wrapping it with suitable moisture-proof material that is sealed to prevent entrance of moisture.

Reference has been made to providing controlled bonds between adjacent wafers such that, although the group of wafers is self-supporting, individual wafers can be removed without breakage. The desired light bond can be secured by controlling the amount of expansion, whereby the expansion is only sufficient to eliminate the spacing between the unexpanded wafers and to form a tight compact pack. Such control can be carried out by controlling the value of the partial vacuum and also the time period during the time period during which the vacuum is applied. An additional control factor is the temperature to which the wafers are heated preliminary to being subjected to a partial vacuum. Also, the side surfaces of the wafers may be dusted with a material like starch powder which tends to prevent a strong bond between wafers. Such dusting with a material like starch should be carried out at the time the wafers are assembled preparatory to heating and expansion.

Referring again to FIG. 6, the expanded wafers 12a are shown in a compact group with adjacent wafers lightly bonded together. One end wafer is shown after it has been manually separated from the stack. The adhesion between wafers is such that an individual wafer can be readily manually removed by breaking the light bond between the wafer and the next wafer of the group. The force required for the break should be such that it does not break or in any way crush the wafer being removed.

Simple separating elements can be inserted between the wafers at the time they are assembled and before expansion, as shown, for example, in FIG. 10. Its configuration corresponds generally to the configuration of the wafers, and it is made of a sheet or film of suitable material, such as wax paper, cellophane or polyethylene. With such a separator, the amount of adhesion between the wafers, if any, depends upon the surface characteristics of the material from which the separators are made. A controlled amount of adhesion can be provided by having openings or perforations 37 in the separators, whereby in the areas of these openings, the expanded material of the wafers comes into direct adhering contact. With such an arrangement, the amount of adhesion depends upon the total area represented by the openings 37.

FIGS. 11 and 12 illustrate another type of separator which can be made of the same material as the separator of FIG. 10 but which is constructed to provide the desired amount of spacing between the wafers before they are expanded, or in other words, to take the place of the corrugated strips 26. In this instance the separator 38 is shown as square in configuration and is intended to be used with wafers which are of the same configuration. The sheet or film is provided with impressed ribs or corrugations 39 which may extend across the separator in two directions as illustrated in FIG. 11. If desired, a series of such ribs may extend in two directions at right angles to each other, forming a grid-like pattern. When such a separator is inserted between the wafers before expansion, the ribs have sufficient strength to hold the wafers apart the desired distance, while at the same time, the ribs are sufficiently weak that when the wafers are expanded, the ribs are flattened whereby the faces of the expanded wafers are brought into juxtaposition, being separated only by the material of the separators. Here again openings 41 can be provided to permit some of the material of the wafers to come into direct contact to provide a controlled amount of adherence between adjacent wafers.

The separator 42 shown in FIGS. 13 and 14 is provided with stud-like protrusions 43. These protrusions can be arranged as desired over the face of the separator, and are of sufficient strength to maintain the desired spacing between wafers before expansion.

As shown in FIGS. 15 and 16, stud-like protrusions 45 and 46 in the separator 44 project on opposite sides of the plane of the separator. As shown in FIG. 16, the protrusions are of sufficient combined height to maintain the desired spacing between the wafers 47 before expansion.

In some instances, it may be desirable to make the separator and the ribs or protrusions of sufficient strength that at the time the wafers are expanded, the protrusions provide an imprint upon the adjacent faces of the wafers. Assuming that the separator is made in this manner, then after expansion of the wafers, the protrusions of the separator remain intact but are imbedded within the adjacent portions of the wafers as shown in FIG. 17. A wafer 47a imprinted in this manner is shown in FIG. 18. The indentations 48 imprinted on the wafers correspond to the protrusions 45.

A wafer made entirely of expanded confection pieces held together as an aggregate can be used of itself as a layer of a food product of the sandwich type. Thus, in FIG. 8, there is shown a common hamburger type sandwich consisting of the outer layers 28 of cooked or baked dough (e.g., bread or bun), and the layer 29 of warm broiled or grilled hamburger meat. A wafer 12a, as shown individually in FIG. 7 and made as previously described, is interposed between the meat 29 and the dough layer 28.

A sandwich-like product as shown in FIG. 8 has enhanced eating properties. I attribute this not only to the flavor imparted by the layer 12a, but in addition to the cruchy character of this layer, due to the fact that it is made from an aggregate of pieces of expandable material. Although the expandable wafer tends to disintegrate when it absorbs liquids, it remains sufficiently intact during consumption of the product to impart the desired flavor and crunchy properties.

In some instances, the sandwich may also include one or more layers of other edible material like sliced cheese which may be interposed between the wafer and the meat. Thus, when a cheeseburger is made, a slice of cheese followed by a wafer can be applied to the hamburger meat and then these ingredients subjected to further grilling to partially melt the cheese and nest the wafer therein.

When introduced into a sandwich of the hamburger type, as shown in FIG. 8, it is generally desirable to include additional seasoning, such as flavoring, condiments, herbs and spices in the wafer. Some such seasoning, such as salt, can be introduced into the confection at the time it is formulated. Additional seasoning can be introduced into the wafers by adding and mixing such material in dry powdered form with pieces of expandable material. For example, seasoning like powdered onion, garlic, mustard and various herbs can be mixed with the expandable pieces before the pieces are formed into an aggregate. It is desirable in such event to mix some dry powdered, expandable sugar with the powdered or discrete condiments, thereby facilitating physical retention of the condiments in the wafer. For example, the powdered sugar may amount to 10 to 50% of the mix. The amount of the discrete mix introduced with the expandable confection pieces may, for example, range from 5 to 50% of the weight of the confection pieces.

The expanded wafers can also be used in connection with hot cakes or pancakes to supplement the usual sugar syrup. Thus, as shown in FIG. 9, the expanded wafer 12a is shown interposed between the two hot cakes or pancakes 31. Here again, wafers are used having the desired flavor characteristics, as for example, a wafer of confection pieces having maple sugar flavoring. In fact, maple sugar in the form of a dry powder can be used with the expandable confection pieces in making the wafer agglomerates.

As previously indicated, good eating properties are imparted by forming the unexpanded wafers of pieces of expandable material which are caused to adhere together as an aggregate. When such an aggregate is expanded, the individual pieces expand and retain their identity with respect to flavoring characteristics, etc. Addition of some moisture to the surfaces of the pieces before they are caused to adhere together as an aggregate serves to facilitate their adhesion together. Also such moisture addition tends to increase the extent of expansion, provided some moisture remains at the time of the expansion operation.

Addition of powdered materials having expandable characteristics, such as moistened powdered corn sugar or crushed or subdivided malted milk balls, serves to promote the desired eating characteristics. Thus, surface moisture can be applied to the pieces, after which expandable powdered material is applied to provide a coating upon the pieces. The moisture in addition to causing the powder to adhere to the pieces promotes expansion of the powder. This serves to facilitate adhesion of the pieces together to form the desired aggregate wafers, and at the time of expansion, the pieces and the coating material expand at different rates to provide friable areas of cleavage. These areas of cleavage are between the expanded pieces, which as previously mentioned are identifiable with the original unexpanded pieces. Materials like corn sugar and powdered malted milk balls expand at a greater rate and to a greater extent than the material from which the pieces are generally made under comparable conditions, whereby the bonds between the expanded pieces are more friable than the expanded material of the pieces themselves. This promotes eating properties in that the expanded pieces tend to break away when the wafer is heated, leaving the separated expanded pieces to be crunched in the mouth.

When introduced into a sandwich of the hamburger type, or in other types of sandwiches, it is deemed desirable for the wafer to include additional seasoning, such as flavoring, condiments, herbs, spices and the like. For example, seasonings like dry powdered onion, mustard, herbs or particles thereof, powdered cheese, protein concentrate powder, and other edible products, can be blended with the expandable pieces prior to the pieces being consolidated in a wafer aggregate. Also certain liquid flavoring ingredients can be applied to the mix in the same manner. Incorporating such ingredients in the agglomerated wafers serves to retain their flavoring constituents, both before and after expansion. After expansion, such flavoring ingredients are incorporated in the cellular structure of the expanded mass. When incorporated in this manner, the flavoring ingredients become immediately separate or exposed during eating, thus making them effective without flavor masking. Incorporation of powdered or discrete flavoring ingredients into the structure of the expanded wafer can be facilitated by blending such materials with a low moisture content, expandable powder such as dry corn sugar or hydrolyzed cereal solids of low dextrin equivalency. For example, the corn sugar content of such a mix of flavoring ingredients can amount to from 2 to 50% by weight of the entire mix, and the amount of such a mix may range from about 2 to 50% of the weight of the expandable pieces. Here again, some moisture can be added to the mix immediately before it is formed into agglomerates. Surface moisture applied at this time aids in producing effective surface stickiness to attach the powdered or discrete ingredients to the expandable pieces, and also in promoting adherence of the pieces to form the wafer aggregate. In addition, such added moisture promotes expansion of both the pieces and the powdered or discrete material. The amount of such added moisture may, for example, range from 0.01 to 2% of the total mix.

Examples of the invention are as follows:

EXAMPLE 1

The expandable material used was a confection such as is employed in the manufacture of peanut brittle, but without the peanuts. This type of confection contains sugars which impart expandable characteristics, particularly corn sugar. The confection, in sheet form, is broken into pieces of such size as will pass through a number 6 mesh screen whereby the pieces are of a diameter of $+1/16 - -\frac{1}{4}$ inch. These pieces are then introduced into shallow circular mold cavities about 3 inches in diameter and 3/16 inch deep. While in the mold cavity, the pieces are heated to a temperature of about 120° F. and light pressure applied to cause some compaction. The resulting unexpanded agglomerates, when removed from the molds after cooling, are about 3 inches in diameter and 3/16 inch thick. The wafers are then assembled into containers of the type shown in FIGS. 3 and 4 with a spacing of about 3/16 of an inch between adjacent wafers. Before being introduced into the container, the surfaces of the wafers are lightly dusted with powdered starch. This assembly is then placed in an oven where it is heated to elevate the temperature of the wafers to about 120° F., thus causing the wafers to be pliant. The assembly is then placed in a chamber, and the chamber evacuated to a partial vacuum corresponding to 28 inches, and the vacuum is maintained for a period of about 5 minutes. This causes the wafers to expand, thereby eliminating the spacing between the wafers and causing the side faces of the wafers to be brought into direct contact with light bonding. After expansion, the wafers were about $\frac{3}{8}$ inch thick, and the diameter of the wafers was slightly increased. Following expansion, the wafers were permitted to cool. Thereafter the container was sealed by providing a moisture proof sealed wrapper. This package contained the expanded wafers tightly packed together and within the container.

It was found that the group of wafers could be removed from the container intact and that, although the group was self-supporting, individual wafers could be readily broken away by applying manual force after several week's storage, and that the force required for the removal of the wafers was insufficient to cause any breakage or crushing of the removed wafer.

EXAMPLE 2

The procedure was the same as in Example 1, except that a small amount of moisture is added to the surfaces of the expandable pieces before the pieces are caused to adhere together as an aggregate. This serves to promote bonding between the pieces. Also it promotes the desired cellular expansion with friable bonds between the expanded pieces. Such bonds provide regions of cleavage such that the expanded pieces break apart in the mouth when force is applied that may be less than that required to crush the expanded pieces.

EXAMPLE 3

The procedure is generally the same as in Example 1. However, a sugar of reduced sweetness, namely hydrolyzed cereal solids of low dextrin equivalency (Morex 20DE) is used in place of a portion of the corn sugar and sucrose, whereby the low dextrin equivalency sugar comprises about 50% by weight of the expandable confection pieces. This produces an expanded wafer of greatly reduced sweetness. In some instances, all of such sugar may be of the low dextrin equivalency type.

EXAMPLE 4

The procedure is the same as in Example 3. However, the pieces of expandable confection are mixed with dry powder consisting of four parts of seasoning in dry powdered form together with one part of Morex (20DE) by weight. The confection pieces were surface moistened by applying a light water spray and then one part of the dry powder mix is combined and intermixed with the moist confection pieces whereby the powder is partially hydrated and adhered to surfaces of the pieces. This material is formed into wafer agglomerates by heating with some compaction. Expanded wafers made in this manner have excellent flavor characteristics without flavor masking, and sweetness is not dominant.

EXAMPLE 5

Wafers made as described in Example 4 are introduced into freshly made hamburger sandwiches in the manner shown in FIG. 8. When the sandwich is eaten, the wafer imparts pleasing crunchy properties which is attributed to the fact that the expanded wafers are made of aggregates of expandable pieces and that the wafers, after expansion, are in fact made of portions corresponding to the unexpanded pieces bonded together as a result of the initial bond imparted when the wafers were first made, and further bonded during expansion. Thus, in effect, the expanded wafers are made up of expanded portions having bonds providing friable cleavage regions of differing physical structure with adjacent expanded portions, all such portions corresponding to the original pieces of confection. Also flavoring components are effectively released as the wafer is being eaten and breakage occurs along the regions of cleavage.

EXAMPLE 6

The procedure is the same as in Example 4, except that the dry powder is maple sugar. Individual wafers are then introduced between freshly prepared hot cakes or pancakes. The expanded wafer imparts pleasing eating characteristics, characterized by crunchiness as described above, and an excellent maple sugar flavoring. In place of maple sugar alone, I can use a blend comprising one part of crushed or powdered malted milk type balls to three parts of maple sugar by weight.

EXAMPLE 7

Wafers are made substantially as described in Example 4. However, the dry powdered mix comprises dry powdered onion, garlic, and corn sugar in equal parts. Such an expanded wafer can be introduced into a freshly made sandwich of the hamburger type, in the manner shown in FIG. 8. The condiments tend to mask over the flavor of the confection pieces, and impart onion and garlic flavors to the product, while at the same time the wafer provides the desirable crunchy characteristics previously described.

I claim:

1. A method for the manufacture of edible products using a container, comprising assembling pieces of confection material into the form of wafers of predetermined uniform thickness and configuration, the pieces being sugar based confection material having expandable properties, heating the pieces to make the surfaces soft and sticky and to cause the same to adhere together, cooling the wafers, assembling a group comprising a multiplicity of such wafers in a container in parallel relationship with void spaces between parallel opposing side surfaces of adjacent wafers, inserting non-edible separating elements in the form of thin sheets or films between and across the opposed side faces of the wafers and in the void spaces before expansion, and then expanding the wafers by heating to soften the same and by subjecting the wafers to a partial vacuum, the expansion serving to cause the wafers to expand in thickness to substantially eliminate the void spaces between the same and to bring opposing side surfaces of adjacent expanded wafers into juxtaposition with formation of bonds between adjacent expanded wafers, and then permitting the expanded group of wafers to cool to form a final product consisting of a self-supporting group or stack of expanded wafers.

2. A method as in claim 1 in which the sheets or films have openings and the expansion of the wafers causes the expanded material to be in direct adhering contact in the areas of the openings to form friable bonds between expanded wafers.

3. A method as in claim 1 in which the sheets or films forming the separating elements have integral protrusions on the faces of the same, the protrusions serving to maintain the desired spacing of the wafers before expansion of the same.

4. A method as in claim 3 in which the protrusions of the separating elements are collapsed when the wafers are expanded.

5. A method as in claim 3 in which the protrusions imprint the wafers during expansion.

6. The food product resulting from the process of claim 2.

* * * * *